United States Patent
Garfield et al.

(10) Patent No.: US 7,811,636 B2
(45) Date of Patent: *Oct. 12, 2010

(54) NON-FLAMMABLE WATERPROOFING COMPOSITION

(75) Inventors: Michael Garfield, Mentor, OH (US); P. James Houston, Richfield, OH (US); Paul Marshall, Creston, OH (US); John Frye, Normandy, TN (US)

(73) Assignee: Elastikote, LLC, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/651,694

(22) Filed: Jan. 4, 2010

(65) Prior Publication Data

US 2010/0112227 A1    May 6, 2010

Related U.S. Application Data

(63) Continuation-in-part of application No. 12/466,789, filed on May 15, 2009, now Pat. No. 7,642,312, which is a continuation-in-part of application No. 11/461,638, filed on Aug. 1, 2006, now Pat. No. 7,598,310, which is a continuation-in-part of application No. 10/713,516, filed on Nov. 14, 2003, now Pat. No. 7,084,201.

(51) Int. Cl.
*B05D 3/00* (2006.01)
*E04B 1/64* (2006.01)
*C08K 5/15* (2006.01)

(52) U.S. Cl. .................. 427/385.5; 427/388.5; 427/393; 427/393.5; 427/427.4; 427/428.01; 427/429; 524/109; 524/505; 52/169.14

(58) Field of Classification Search ............... 427/385.5, 427/388.5, 393, 393.5, 427.4, 428.01, 429; 52/169.14; 524/109, 505
See application file for complete search history.

(56) References Cited

U.S. PATENT DOCUMENTS

| | | | |
|---|---|---|---|
| 2,822,368 A * | 2/1958 | Rowland et al. ............ 549/540 |
| 3,577,398 A | 5/1971 | Pace | |
| 4,011,178 A | 3/1977 | Muse | |
| 4,042,554 A | 8/1977 | Poskitt | |
| 4,042,555 A * | 8/1977 | Raimondi et al. ........... 524/505 |
| 4,515,992 A | 5/1985 | Gupta | |
| 4,654,398 A | 3/1987 | McFadden | |
| 4,853,069 A | 8/1989 | Williams et al. | |
| 4,970,242 A | 11/1990 | Lehman | |
| 5,023,290 A | 6/1991 | Gaidis | |
| 5,145,748 A | 9/1992 | Gaidis et al. | |
| 5,177,163 A | 1/1993 | Chu et al. | |
| 5,352,531 A | 10/1994 | Roberts | |
| 5,534,303 A | 7/1996 | Roberts | |
| 5,534,583 A | 7/1996 | Roberts | |
| 5,610,239 A | 3/1997 | Skelley | |
| 5,804,635 A | 9/1998 | Roberts | |
| 5,807,638 A | 9/1998 | Roberts | |
| 5,925,706 A | 7/1999 | Roberts | |
| 5,932,646 A | 8/1999 | Roberts | |
| 6,025,032 A * | 2/2000 | Gaveske .................. 427/393.6 |
| 6,224,700 B1 | 5/2001 | Oakley | |
| 7,084,201 B2 | 8/2006 | Garfield et al. | |
| 7,119,135 B2 | 10/2006 | Neimann | |
| 7,642,312 B2 * | 1/2010 | Garfield ..................... 524/505 |
| 2006/0281855 A1 | 12/2006 | Garfield et al. | |
| 2007/0160766 A1 | 7/2007 | Copeland | |

FOREIGN PATENT DOCUMENTS

| GB | 2 223 023 A | 3/1990 |
|---|---|---|
| GB | 2223023 A * | 3/1990 |

OTHER PUBLICATIONS

Search Report & Written Opinion of PCT/US2009/044133, Feb. 3, 2010, 7 pages.

* cited by examiner

*Primary Examiner*—Fred M Teskin
(74) *Attorney, Agent, or Firm*—Hahn Loeser & Parks, LLP; Keith J. Marcinowski

(57) ABSTRACT

A method of coating an exterior surface of a structure comprising a composition of matter and a solvent system is disclosed. The solvent system includes a chlorinated solvent and a vegetable oil. The solvent system and coating composition are non-flammable, environmentally friendly and provide an improved, elastomeric coating when applied to the exterior surface of the structure.

20 Claims, No Drawings

NON-FLAMMABLE WATERPROOFING COMPOSITION

CROSS-REFERENCE TO RELATED APPLICATIONS/INCORPORATION BY REFERENCE

This patent application is a continuation-in-part patent application claiming priority to U.S. patent application Ser. No. 12/466,789 filed May 15, 2009, now U.S. Pat. No. 7,642,312, which is a continuation-in-part of U.S. patent application Ser. No. 11/461,638 filed Aug. 1, 2006, now U.S. Pat. No. 7,598,310, which is a continuation-in-part of U.S. patent application Ser. No. 10/713,516 filed on Nov. 14, 2003, now U.S. Pat. No. 7,084,201, which is incorporated herein by reference in its entirety.

TECHNICAL FIELD

The invention relates to protective coatings for a surface of a structure. More particularly, the invention relates to polymer and rubber based materials in a solvent system for application to the exterior surface of a structure. The coating solution of the invention is non-flammable.

BACKGROUND OF THE INVENTION

Basement and foundation waterproofing is a critical aspect of the construction of new buildings. The waterproofing process generally involves applying a composition to a wall to impart water resistant properties. Prior art coatings included asphalts dissolved in a solvent which are sprayed onto a wall. It is common to apply a protective board over the coating for facilitating water drainage and/or providing additional insulation.

In addition to superior water resistant characteristics, good basement wall coatings require a variety of properties in order to be considered satisfactory. They should be strong, have good elasticity, and be able to be applied uniformly to the surface of a wall. While asphalt based compositions have performed satisfactorily, polymer based compositions are also particularly useful for waterproofing. Since polymer based coatings usually have more than one solid ingredient in the formulation, it is important that all ingredients be chemically compatible to avoid separation of the polymer components from the solution resulting in loss of the desirable properties of the solution. Such separation can cause loss of elasticity, strength, tack, and water resistance.

In many waterproofing applications it is generally preferred to apply a protective board while the coating is still wet. In some cases, however, this is not possible. Therefore, it is desirable for the coating to maintain aggressive residual tack, even when the coating is dry. Without sufficient tack, the waterproofer must often resort to mechanical fasteners such as nails to hold the protective board to the wall. Such mechanical fasteners put holes in the coating, jeopardizing its waterproofing ability.

When using a coating comprised of polymeric materials, it is important that there be a proper physicochemical interaction between the polymers and the solvent. The solvent must be able to dissolve the various polymers as well as impart additional characteristics to the composition as a whole. Such properties are unique to the solvent system itself as will be explained herein.

A satisfactory coating should also provide a consistent, uniform coating on the wall. The solvent is believed to be related to the consistency of the coating applied to the wall. Coating that runs down the wall during application may lead to weak spots in the coating. The solvent also affects the drying rate of the coating. When the prior art coatings cure too quickly due to factors such as elevated temperatures or exposure to sunlight, trapped air may cause pinholes in the coating surface, as the air escapes from the coating. The rupturing of such pin holes also leads to weak spots in the coating. Therefore, there is a need in the prior art for a solvent system, which eliminates aeration and allows for the release of trapped air from the coating irrespective of the rate at which the coating dries.

Solvent systems used in prior art coatings are generally highly explosive and flammable. For example, U.S. Pat. No. 5,352,531 to Roberts recommends using combinations of an aliphatic petroleum distillate, such as LACOLENE sold by Ashland Chemical Company, and toluene. Such a solvent has a flash point of about 18° F. As another example, U.S. Pat. No. 5,932,646 to Roberts uses a solvent that is a blend of petroleum distillates, preferably naphthenic distillates, and heptane. A solvent recommended in this patent is sold by UNOCAL Linder the name Lactol Spirits. This solvent has a flash point of about 17° F. As a result of the extremely low flash points, solutions including these solvents are highly explosive. Thus, they are very dangerous to use as the slightest spark may ignite the vapors around the material, Chlorinated organic solvents have not previously been used in waterproofing applications, likely because their use was believed to be cost prohibitive.

In addition, the prior art compositions exhibited a very low viscosity at spraying temperatures snaking sag and run down more likely until the material cooled and began to dry. Waterproofing compositions that have a lower viscosity at spraying temperature also require the application of more coats of the composition to achieve the desired thickness of the waterproofing material.

Elastomeric, emulsion-based coatings, which includes water-based acrylic polymer coating systems, currently dominate the roof coating market. Oil-based products have been almost completely replaced by water based products due to their volatile organic content (VOC). Oil-based products have historically not been deemed suitable for roof coatings because of their need for a carrier solvent that typically is a VOC material and composes 40% to 60% of the coating formulation. Currently, environmental laws in California allow 2.3 pounds per gallon of V.O.C., or a limit of 18% V.O.C.

The Environmental Protection Agency (EPA) oversees the "Energy Star" program. Energy Star is an international standard for energy efficient consumer products. It was first created as a United States government program in 1992. In order for a coating to receive the "Energy Star Approval," for example, a roof coating must maintain a reflectance of over "65" after three years of outdoor weathering. The reflectivity requirement is based on the fact that a white, reflective coating will reflect the heat produced by the sun and dramatically lower the amount of heat developed on the roof surface of the building. The less amount of heat that is produced by the roof will typically result in lower air conditioning costs and a significant reductions in electrical usage which is generated by highly polluting coal fired plants.

The inability to meet the EPA and VOC standards have been major obstacles to the use of previous oil based coatings for roof coatings. The use of flammable solvents, poor fire ratings, susceptibility to mold and fungal growth, formation of a skin in the container and the need for heavy metals to cure the coating have prevented these oil-based coatings from being recognized as Energy Star products.

Thus, a need exists for an improved coating system for use in waterproofing applications, which is capable of dissolving rubber and polymer-based waterproofing compositions to allow them to be applied on roofs that are non-flammable and qualify for Energy Star approval.

SUMMARY OF THE INVENTION

In general, one aspect of the invention is to provide an elastomeric waterproofing coating that is nonflammable and may be considered an environmentally friendly and bio-preferred product, and that when applied to an exterior surface of a structure, will result in a uniform and consistent coating on the exterior surface of the structure that is impermeable to water upon curing.

In general, the invention provides a method of coating an exterior surface of a structure. The method includes the steps of preparing a coating solution, wherein the coating solution includes a hydrocarbon resin, a block copolymer selected from the group consisting of styrene-isoprene-styrene block copolymers, styrene-butadiene-styrene block copolymers, and styrene-ethylene/butylene-styrene block copolymers and mixtures thereof, and a non-flammable solvent system including at least one chlorinated organic solvent and at least one vegetable oil. The method also includes the steps of applying the coating solution to at least a portion of the exterior surface of the structure, and evaporating the at least one chlorinated organic solvent to form an elastomeric coating on the exterior surface of the structure.

In yet another aspect of the invention, a method of waterproofing an exterior surface of a structure is provided. The method includes the steps of preparing a coating solution, wherein the coating solution includes a hydrocarbon resin, a block copolymer, a solvent system including at least one chlorinated organic solvent and at least one vegetable oil, and a ultra-violet reflective pigment. The method also includes the steps of applying the coating solution to at least a portion of the exterior surface of the structure, and evaporating the at least one chlorinated organic solvent to form an elastomeric coating on the exterior surface of the structure.

At least one or more of the foregoing objects of the present invention together with the advantages thereof over the prior art will become apparent from the description of the invention that follows. Exemplary compositions of the coating and methods of applying such coating are described herein by way of example. The specification does not attempt to show all the various forms and modifications in which the present invention might be embodied, rather the invention should be measured by the claims presented herein.

DETAILED DESCRIPTION OF THE INVENTION

The present invention is generally directed to a polymer based waterproofing composition for application to the exterior surface of basement or foundation walls. The waterproofing coating of the present invention is capable of being applied at various ambient temperatures. The coatings are applied by spraying, and to achieve proper spraying properties, it is recommended to heat the solution to between about 105° F. to about 160° F., preferably between about 120° F. to about 140° F. It is preferred that an airless spray be employed to apply the coating. An example of a suitable technique is to use a Graco 733 airless sprayer, using between about 2,500 psi and about 4,000 psi.

The coating itself is a mixture of a hydrocarbon resin and a block copolymer dissolved in a chlorinated organic solvent. The block copolymers are generally selected frown the group consisting of styrene-isoprene-styrene block copolymers, styrene-butadiene-styrene block copolymers, or styrene-ethylene/butylene-styrene block copolymers. It is contemplated that other block copolymers with sufficient waterproofing characteristics may also be used without departing from the scope of the present invention.

The block copolymers or rubber compositions employed in the present invention are well-known in the art and are commercially available. Typically the molecular weight of suitable polymers will be in the range of about 60,000 to about 180,000. In addition, the styrene content, the isoprene content, the butadiene content, the ethylene content, and/or the butylenes content is not critical. Typically, the styrene content will be between about 10% to about 35% by weight. Suitable materials are available under the trademark KRATON™ and are supplied by Kraton Polymers. The block copolymer may be included in an amount from about 10% to about 15% by weight of the total coating formulation.

Hydrocarbon resins as used in the present invention are also commercially available. The hydrocarbon resin may be selected from polyterpene resins or petroleum hydrocarbon resins. Polyterpene resins are typically formed by the polymerization of $C_{10}H_{16}$ monomers, such as alpha-pinene, beta-pinene, limonene, dipentene, beta-phellandrene, myrcene, 3-carene, camphene and terpinolene. The hydrocarbon resin may also be a petroleum resin meaning a resin that is produced by the polymerization of cracked petroleum distillates. Such hydrocarbon resins can be formed by polymerizing aliphatic olefins and diolefins having four to six carbon atoms. Typically, the olefins and diolefins consist primarily of monomers having five carbon atoms. Most desirably the hydrocarbon resin will be provided with some aromaticity. The aromaticity can be provided by polymerizing the monomers in the presence of styrene or an alpha-methyl styrene. Less suitably, the styrene and alpha-methyl styrene can be separately polymerized and blended in with the $C_4$-$C_6$ polymerized resin. Exemplary formulations can be found in U.S. Pat. No. 3,577,398. Such hydrocarbon resins are solid at room temperature. Representative monomers include isoamylene (2,2 dimethyl-a propene), piperylene (1,3 pentadiene, isoprene (2-methyl-1,3 butadiene), 2 methyl-1 butene and 2 methyl-2 butene. Typically the hydrocarbon resins have softening points in excess of about 140° F. or 158° F. (60° C. or 70° C.) and usually in the range of about 140° F. (60° C.) to about 356° F. (180° C.). Most desirably, they have softening points in the range from about 176° F. (80° C.) to about 230° F. (110° C.).

Commercially available hydrocarbon resins suitable for use in the present invention include PICCOTAC™ 1095 resin and REAGALREZ™ 1094 resin both available from Eastman resins, PICCOTAC™ 1095 is an aliphatic C5 resin, which has a narrow molecular weight distribution. REAGALREZ™ 1094 resin is a hydrocarbon resin that is produced by polymerization and hydrogenation of pure monomer hydrocarbon feedstocks. Also suitable is a resin sold under the trademark WINGTACK by Goodyear Chemical. In one embodiment of the present invention, a resin sold as WINGTACK™ 86 is suitable. WINGTACK™ 86 resin is an aromatically modified C5 hydrocarbon resin. Resins similarly prepared or having similar characteristics are considered suitable and within the scope of the present invention. Other commercially available resins may also be used without departing from the scope of the present invention. The hydrocarbon resin may be included in the coating formulation in an amount from about 10% to about 15% by weight of the total coating formulation.

The solvent system employed for the present invention comprises a chlorinated organic solvent. Chlorinated organic solvents that can be used in the present invention include, but are not limited to, methylene chloride, ethylene tetrachloride, ethylene trichloride, ethane trichloride, dichloroethene, including 1,1 dichloroethene as well as 1,2 dichloroethene (cis and trans), trichloromethane, carbon tetrachloride, and chloroacetyl chloride. In one preferred embodiment, the solvent system includes a chlorinated organic solvent with the chemical formula $C_2Cl_4$, which is commonly referred to as ethylene tetrachloride. Ethylene tetrachloride is sometimes also referred to as perchlor, tetrachloroethylene, and perchloroethylene. Perchlor solvent blends are commercially available. In one embodiment of the invention, the perchlor is recycled.

The chlorinated organic solvent may be included in an amount from about 30% to about 40% by weight of the total coating formulation. With regards to the solvent system, the chlorinated organic solvent may be included in an amount from about 50% to about 67% by weight of the solvent system.

In one embodiment, the perchlor blend solvent used has additional agents added including, but not limited to, emulsifiers, wetting agents, solubilizers, and stabilizers. Other ingredients may be added to or removed from the perchlor solvent without departing from the scope of the present invention but are not needed for the beneficial safety advantages of the present invention. In another embodiment of the invention, a commercially available solvent provided by CHEM-SAFE International as Formula 11979 may be used.

In yet another embodiment of the invention, a commercially available solvent that includes a blend of azeotropes of trans-1,2-dichloroethene and hydrofluoroethers provided by 3M™, as Novec™ HFE-72DE, may be used. The Novec™ HFE-72DE has important safety and environmental properties including non-flammability, low toxicity, zero ozone depletion and low global warming potential, In a further embodiment, a commercially available solvent that includes a blend of hydrofluoroethers provided by 3M™ as Novec™ 7200, Novec™ 8200 or mixtures thereof is used. The Novec™ 7200 and 8200 (each comprising a mixture of about 20 to about 80 percent by weight of ethyl nonafluoroisobutyl ether and about 20 to about 80 percent by weight of ethyl nonafluorobutyl ether) have zero ozone depletion potential and low global warming potential, are excluded by the U.S. Environmental Protection Agency from the definition of a volatile organic compound (VOC) on the basis that they have a negligible contribution to troposperic ozone formation, and are listed as a Clean Air Solvent by California's South Coast Air Quality Management District. In a further embodiment of the present invention, a solvent that includes at least one hydrofluroether or a mixture of two or more hydrofluoroethers thereof is used.

In still yet another embodiment of the invention, the solvent system may also include at least one vegetable oil. The use of at least vegetable oil in the solvent system may facilitate the preparation of an environmentally friendly, "green" coating solution that may qualify as an Energy Star energy efficient product. The use of at least vegetable oil in the solvent system may also facilitate the coating solution in qualifying for a BioPreferred$^{SM}$ status through the United States Department of Agriculture. By achieving the BioPreferred$^{SM}$ status, the coating solution would be included in a searchable database of biobased products for Federal and contractor personnel.

Suitable vegetable oils that may be used in the coating solution of the invention include palm oil, soybean oil, rapeseed oil, canola oil, sunflower oil, peanut oil, cottonseed oil, coconut oil, olive oil and mixtures thereof. In one embodiment of the invention, the vegetable oil is soybean oil. In yet another embodiment of the invention, the vegetable oil is epoxidized soybean oil. The vegetable oil may be included in an amount from about 20% to about 30% by weight of the total coating formulation. With regards to the solvent system, the vegetable oil may be included in an amount from about 33% to about 50% by weight of the solvent system.

It is also acceptable and sometimes preferred to add a coloring agent to the waterproofing solution. This can be done to allow the waterproofing composition to match the color of a wall being coated or to contrast with the color of the wall to allow defects in the waterproof coating to be easily visualized. In one embodiment, green or gray pigments are used, although other colors will not depart from the scope of the present invention. Pigments suitable for use in the present invention are commercially available. Examples of acceptable coloring agents include but are not limited to chromium oxide with green pigment and aluminum paste. Suitable coloring agents may be obtained from Landers-Segal Color Company, also known as LANSCO or from Arquimex.

In another embodiment of the invention, a reflective pigment may be added to the solution. After the roof coating has been applied and cured, the reflective pigment is capable of minimizing the effect of ultra-violet rays of light as well as reducing the effect of solar heat on the coating. An example of a reflective pigment includes titanium dioxide, as well as the mineral forms of titanium dioxide which includes rutile, anatase, and brookite. The reflective pigment may be included in an amount from about 5% to about 7% by weight of the total coating formulation.

In yet another embodiment of the invention, a reflective glass filler material may be added to the coating solution. The reflective glass filler material is a white, low alkali glass powder. In one embodiment, the reflective glass filler material is recycled, glass byproduct that is processed from post-industrial materials generated at fiberglass plants. In another embodiment, the glass byproduct is post consumer recycled glass. The reflective glass filler material is also capable of minimizing the effect of ultra-violet rays of light as well as reducing the effect of solar heat on the coating. The reflective glass filler material may be included in an amount from about 0% to about 10% by weight of the total coating formulation.

Coating solutions made in accordance the present invention are non-flammable and have no flash point. The solvent system improves the solubility of the polymer mix and is highly stable, showing little separation of the polymers from the solution. In addition, the solvent system provides for better suspension of any pigments or coloring agents added to the solution to provide more consistent color of the coating once it is applied to a wall. After the coating solution is applied to a wall, the solvent system evaporates leaving a water impervious, elastomeric coating on the wall. As the coating solution of the present invention dries, it exhibits little to no aeration. The improved release of trapped air to the surface of the coating provides a coating without pinholes or blisters which lead to weak spots in the coating. Solutions in accordance with the present invention exhibited improved coating capabilities over the prior art resulting in less sag and run down. Finally, in some embodiments of the present invention, the coating exhibits improved adhesion and tack characteristics to facilitate installation of insulation or drainage boards overtop of the coating.

EXAMPLE I

A composition of the present invention was made by mixing the following ingredients at the following concentrations:

TABLE I

| Ingredient | Amount (pounds) |
| --- | --- |
| CHEMSAFE International Formula 11979 | 5.5 |
| Piccotac ™ Resin | 1.6 |
| KRATON ™ D 1107 | 1.6 |
| Green Pigment Chromium Oxide (Landers-Segal Company) | 0.3 |

This coating had a viscosity of 14,400 cps at 77° F. and 5600 cps at 140° F. and exhibited superior properties for applying the coating to basement walls. The coating provided a uniformly thick coat, with limited sag and rundown. It also dried with substantially no aeration as the solvent evaporated resulting in a coating substantially without pinholes or weak spots in the coating. This coating also exhibited very aggressive residual tack to facilitate the placement of a protective board over the coating.

EXAMPLE II

Another composition of the present invention was made by combining the following ingredients:

TABLE II

| Ingredient | Amount (pounds) |
| --- | --- |
| CHEMSAFE International Formula 11979 | 6.0 |
| WINGTACK ™ 86 resin | 1.6 |
| KRATON ™ D 1102 | 1.6 |
| Green Pigment Chromium Oxide (Landers-Segal Company) | 0.3 |

This composition also exhibited improved coating, spraying and drying characteristics as described herein. A coating, made by the above formulation, dried with residual tack for approximately 24 hours. After that time, the tack subsided, and the coating was able to be left without protective board while still exhibiting suitable waterproofing capabilities.

Another coating suitable for application in the roof restoration market may be made by combining ingredients in accordance with the present invention:

TABLE III

| Ingredient | Amount (pounds) |
| --- | --- |
| CHEMSAFE International Formula 11979 | 6.5 |
| Regalrez ™ resin | 1.6 |
| KRATON ™ G1652 or Calprene ® H6110 | 1.6 |
| Aluminum paste(Arquimex Company) | 0.3 |

This coating had a viscosity of about 2,000 cps at 77° F. and about 500 cps at 140° F. and exhibited superior properties for applying the coating to a roof surface. The coating provided a uniformly thick coat, with limited sag and rundown. It also dried with substantially no aeration as the solvent evaporated resulting in a coating substantially without pinholes or weak spots in the coating. This coating also exhibited very aggressive residual tack to facilitate the placement of a protective board over the coating.

The roof coating solutions made in accordance with the invention are non-flammable, non-VOC and biobased. The solvent system, including at least one chlorinated organic solvent and at least one vegetable oil, improves the solubility of the polymer mix, is highly stable, showing little separation of the polymers from the solution, and is environmentally friendly. In addition, the solvent system provides for better suspension of any reflective pigments and reflective glass filler material, as well as added to the solution to provide more consistent color of the coating once it is applied to the surface of a roof.

After the coating solution is applied to a roof surface, the solvent system evaporates leaving a water impervious, elastomeric, solar and UV-reflective coating on the roof surface. As the coating solution of the present invention dries, it exhibits little to no aeration. The improved release of trapped air to the surface of the coating provides a coating without pinholes or blisters which lead to weak spots in the coating.

EXAMPLE III

A representative composition for coating the surface of a roof was made by mixing the following ingredients at the following concentrations:

TABLE IV

| Ingredient | Weight % |
| --- | --- |
| Ethylene tetrachloride | 30-40 |
| Vegetable oil | 20-30 |
| Block copolymer | 10-15 |
| Hydrocarbon resin | 10-15 |
| Reflective glass filler | 0-10 |
| Pigment | 5-7 |

It was determined that this coating formulation, when applied to a roof surface at ambient temperature provided a recoat time of about 3 hours and cured within about 24 hours. The coating dried with substantially no aeration as the solvent evaporated resulting in a coating substantially without pinholes or weak spots in the coating. The cured coating provided a uniformly thick coat with the following measured properties:

| | |
| --- | --- |
| Elongation | >1000% |
| Tensile strength | 200 psi minimum |
| Reflectivity | 89% plus |
| Emissivity | 0.88 |
| Weatherability | substantially no yellowing, cracking and separation at +2000 hours through QUV accelerated weather testing |

Another composition for coating the surface of a roof was made by mixing the following ingredients at the following concentrations:

TABLE V

| Ingredient | Weight % |
| --- | --- |
| Recycled ethylene tetrachloride | 30-40 |
| Soybean oil | 20-30 |
| styrene-ethylene/butylene- styrene block copolymer | 10-15 |

TABLE V-continued

| Ingredient | Weight % |
| --- | --- |
| Piccotac ™ Resin | 10-15 |
| Reflective glass filler | 0-10 |
| Titanium dioxide | 5-7 |

The coatings, as described herein, may be applied to the surface of structures by spraying, rolling, and brushing. During application with a sprayer, in order to achieve proper spraying properties such as self-leveling properties, it is recommended to heat the composition to between about 105° F. to about 160° F., preferably between about 120 ° F. to about 140° F. An airless sprayer may be employed to apply the coating. An example of a suitable technique is to use a Graco 733 airless sprayer, using between about 2,500 psi and about 4,000 psi. In most applications, the coating, after evaporation of the ethylene tetrachloride, may have a film thickness of at least 20 mils. In other applications when a thicker coating is required, for example over seam and joint applications, the coating, after evaporation of the ethylene tetrachloride, may have a film thickness of at least 50 mils.

A coating made according to the above formulation, in particular as shown in Tables IV and V may be used for metal roof restoration, for the repair of polymeric roofing or for other waterproofing applications. Suitable polymeric materials for polymeric roofing includes, but is not limited to, including synthetic and natural elastomer rubbers, thermoplastic polymers, such as thermoplastic elastomers, plastic, recycled plastic, and composite materials. The coating according to the above formulation may also be used in coating concrete, plywood, built-up roofs and styrene-butadiene-styrene-modified rolled roofing.

In one embodiment of the invention, a composition prepared as shown in Tables IV and V may be used to coat metal, polymeric, wherein the coating may be applied between polymeric layers if present, and wood roofs. The resulting coating, formed by evaporation of the ethylene tetrachloride, may be used to restore, renew, pre-treat, prime, repair, seal, and protect the roofs described herein. When used as a primer, the coating may be used to treat a variety of substrates such as brick, cement, concrete, existing polymeric roof structures, as well as wood. The coating may also provide the benefit of reflecting harmful ultra-violet (UV) rays emitted from the sun and protecting the roofs from hail damage.

In another embodiment of the invention, a composition prepared as shown in Tables IV and V, and the resulting coating, formed by evaporation of the ethylene tetrachloride, may be used for protecting other structures from water and UV damage. Examples of structures include silos, storage bins, aircraft hangars, oil tanks, petroleum tanks, general purpose metal and wooden storage tanks, wooden and chain-link fences, wood power line and telephone poles, and bridges.

Other proposed uses for the composition prepared as shown in Tables IV and V, and the resulting coating, formed by evaporation of the ethylene tetrachloride, include waterproofing above grade and below grade structures, as an air barrier for commercial and residential structures, for asbestos encapsulation and abatement, the sealing of the roofs of trucks, trailers, and recreational vehicles for protection against water leakage and to provide UV reflectivity, coating rebar prior to use in reinforced concrete and masonry structures, and as a waterproofing membrane for use in plaza decking.

The invention has been described with respect to several embodiments. This description is not intended as a limitation. Other modifications or variations in the specific form shown and described will be apparent to those skilled in the art and will fall within the scope of the invention and the scope of the following claims.

What is claimed is:

1. A method of coating an exterior surface of a structure, the method comprising the steps of:
    preparing a coating solution, the coating solution including:
        a hydrocarbon resin;
        a block copolymer selected from the group consisting of styrene-isoprene-styrene block copolymers, styrene-butadiene-styrene block copolymers, and styrene-ethylene/butylene-styrene block copolymers and mixtures thereof; and
        a non-flammable solvent system including at least one chlorinated organic solvent and at least one vegetable oil;
    applying the coating solution to at least a portion of the exterior surface of the structure; and
    evaporating the at least one chlorinated organic solvent to form an elastomeric coating on the exterior surface of the structure.

2. The method of claim 1, wherein the structure is selected from the group consisting of a metal roof, a polymeric roof, a wood roof, a silo, a storage bin, an aircraft hangar, an oil tank, a petroleum tank, a metal storage tank, a wooden storage tank, a wooden fence, a chain-link fence, a wood power line, a wood telephone pole, a bridge, and the roofs of trucks, trailers, and recreational vehicles.

3. The method of claim 1, wherein the elastomeric coating is impermeable to water.

4. The method of claim 1, wherein the coating solution is applied to the exterior surface of the structure selected from the group consisting of spraying, rolling and brushing.

5. The method of claim 1, wherein the at least one chlorinated organic solvent is selected from the group consisting of methylene chloride, ethylene tetrachloride, ethylene trichloride, ethane trichloride, trichloromethane, carbon tetrachloride, and chloroacetyl chloride.

6. The method of claim 5, wherein the at least one chlorinated organic solvent is ethylene tetrachloride.

7. The method of claim 1, wherein the at least one vegetable oil is selected from the group consisting of palm oil, soybean oil, rapeseed oil, canola oil, sunflower oil, peanut oil, cottonseed oil, coconut oil, olive oil and mixtures thereof.

8. The method of claim 7, wherein the at least one vegetable oil is soybean oil.

9. The method of claim 8, wherein the soybean oil is epoxidized soybean oil.

10. The method of claim 1, wherein the coating solution further comprises at least one pigment.

11. The method of claim 10, wherein the pigment is titanium dioxide.

12. The method of claim 1, wherein the coating solution further comprises a reflective glass filler material.

13. The method of claim 12, wherein the reflective glass filler material is a recycled glass byproduct.

14. The method of claim 1, wherein the solvent system comprises a perchlor blend, the perchlor blend comprising perchloroethylene, vegetable oil, and additives selected from the group consisting of wetting agents, emulsifying agents, solubilizing agents, stabilizing agents and combinations thereof.

15. A method of waterproofing an exterior surface of a structure, the method comprising the steps of:
   preparing a coating solution, the coating solution including:
   a hydrocarbon resin;
   a block copolymer;
   a solvent system including at least one chlorinated organic solvent and at least one vegetable oil; and
   a ultra-violet reflective pigment;
   applying the coating solution to at least a portion of the exterior surface of the structure; and
   evaporating the at least one chlorinated organic solvent to form an elastomeric coating on the exterior surface of the structure.

16. The method of claim 15, wherein the structure is selected from the group consisting of a metal roof, a polymeric roof, a wood roof, a silo, a storage bin, an aircraft hangar, an oil tank, a petroleum tank, a metal storage tank, a wooden storage tank, a wooden fence, a chain-link fence, a wood power line, a wood telephone pole, a bridge, plaza decking, and the roofs of trucks, trailers, and recreational vehicles.

17. The method of claim 15, wherein the coating solution is applied to the exterior surface of the structure selected from the group consisting of spraying, rolling and brushing.

18. The method of claim 15, wherein the at least one chlorinated organic solvent is selected from the group consisting of methylene chloride, ethylene tetrachloride, ethylene trichloride, ethane trichloride, trichloromethane, carbon tetrachloride, and chloroacetyl chloride.

19. The method of claim 15, wherein the ultra-violet reflective pigment is titanium dioxide.

20. The method of claim 15, wherein the coating solution further comprises a reflective glass filler material.

* * * * *

UNITED STATES PATENT AND TRADEMARK OFFICE
CERTIFICATE OF CORRECTION

PATENT NO.       : 7,811,636 B2
APPLICATION NO.  : 12/651694
DATED            : October 12, 2010
INVENTOR(S)      : Garfield et al.

It is certified that error appears in the above-identified patent and that said Letters Patent is hereby corrected as shown below:

IN THE SPECIFICATION:

Column 2, line 21, "Linder" should read --under--.

Column 2, line 30, "snaking" should read --making--.

Signed and Sealed this
Eleventh Day of January, 2011

David J. Kappos
*Director of the United States Patent and Trademark Office*